(12) United States Patent
Eun et al.

(10) Patent No.: US 11,073,985 B2
(45) Date of Patent: Jul. 27, 2021

(54) TOUCH PROCESSING METHOD AND ELECTRONIC DEVICE SUPPORTING SAME

(71) Applicant: Samsung Electronics Co., Ltd., Gyeonggi-do (KR)

(72) Inventors: Dong Jin Eun, Gyeonggi-do (KR); Woo Hyun Kim, Seoul (KR); Hee Jin Kim, Seoul (KR); Seung Yong Lee, Seoul (KR); Chi Hoon Lee, Seoul (KR); Hae Na Lee, Seoul (KR); Jee Yeun Wang, Seoul (KR); Ah Young Kim, Seoul (KR); Hyun Seok Seo, Seoul (KR); Hyo Jin Bae, Seoul (KR); Wan Soo Lim, Gyeonggi-do (KR); Hee Woon Kim, Gyeonggi-do (KR); Sung Chan Bae, Gyeonggi-do (KR); Jung Eui Seo, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 192 days.

(21) Appl. No.: 16/310,642

(22) PCT Filed: Jun. 14, 2017

(86) PCT No.: PCT/KR2017/006198
§ 371 (c)(1),
(2) Date: Dec. 17, 2018

(87) PCT Pub. No.: WO2017/217762
PCT Pub. Date: Dec. 21, 2017

(65) Prior Publication Data
US 2020/0319794 A1    Oct. 8, 2020

(30) Foreign Application Priority Data
Jun. 15, 2016    (KR) .......................... 10-2016-0074515

(51) Int. Cl.
G06F 3/041    (2006.01)
G06F 3/0488    (2013.01)

(52) U.S. Cl.
CPC ........ G06F 3/04886 (2013.01); G06F 3/0414 (2013.01)

(58) Field of Classification Search
CPC ...... G06F 3/041; G06F 3/0414; G06F 3/0484; G06F 3/0488; G06F 3/04886
(Continued)

(56) References Cited

U.S. PATENT DOCUMENTS 8,321,802 B2    11/2012  Rogers
8,847,996 B2     9/2014  Chalkov
(Continued)

FOREIGN PATENT DOCUMENTS

KR    1020110093729     8/2011
KR    1020110126279    11/2011
(Continued)

OTHER PUBLICATIONS

PCT/ISA/210 Search Report issued on PCT/KR2017/006198, pp. 11.
PCT/ISA/237 Written Opinion issued on PCT/KR2017/006198, pp. 5.

Primary Examiner — Tony O Davis
(74) Attorney, Agent, or Firm — The Farrell Law Firm, P.C.

(57) ABSTRACT

An electronic device includes a display configured to display at least one content, a pressure sensor configured to sense a touch input having a pressure value of a specified value or more, a memory, and a processor operatively connected to the display, the pressure sensor, and the memory. When the touch input occurs in a first screen of the display, the processor is configured to determine an input location of the touch input, to verify content displayed at a display location
(Continued)

of the first screen corresponding to the input location, to create a widget including information associated with the content, and to output the created widget to a second screen of the display.

15 Claims, 14 Drawing Sheets

(58) Field of Classification Search
 USPC .................................................. 345/170–178
 See application file for complete search history.

(56) References Cited

U.S. PATENT DOCUMENTS

| | | | |
|---|---|---|---|
| 9,058,092 B2 | 6/2015 | Rogers | |
| 9,354,768 B2 | 5/2016 | Oh et al. | |
| 9,778,771 B2 | 10/2017 | Bernstein et al. | |
| 9,857,897 B2 | 1/2018 | Westerman | |
| 9,965,074 B2 | 5/2018 | Bernstein et al. | |
| 2009/0225053 A1* | 9/2009 | Hu | G06F 3/0482 345/173 |
| 2010/0122194 A1 | 5/2010 | Rogers | |
| 2011/0063248 A1* | 3/2011 | Yoon | G06F 3/0485 345/174 |
| 2011/0202883 A1 | 8/2011 | Oh et al. | |
| 2012/0306929 A1 | 12/2012 | Chalkov | |
| 2013/0067377 A1 | 3/2013 | Rogers | |
| 2013/0321301 A1* | 12/2013 | Takeichi | G06F 3/04842 345/173 |
| 2015/0138126 A1* | 5/2015 | Westerman | G06F 3/0412 345/173 |
| 2015/0138155 A1 | 5/2015 | Bernstein et al. | |
| 2015/0186101 A1* | 7/2015 | Zhang | G06T 11/60 345/173 |
| 2015/0277744 A1* | 10/2015 | Tang | G06F 40/166 715/863 |
| 2016/0132209 A1* | 5/2016 | Abe | G06F 3/0488 715/834 |
| 2018/0024681 A1 | 1/2018 | Bernstein et al. | |
| 2018/0113512 A1* | 4/2018 | Kang | G06F 3/04883 |
| 2019/0220133 A1* | 7/2019 | Han | G06F 3/04883 |

FOREIGN PATENT DOCUMENTS

| | | |
|---|---|---|
| KR | 1020120134932 | 12/2012 |
| KR | 101345500 | 12/2013 |
| KR | 1020140131051 | 11/2014 |
| WO | WO 2012030006 | 3/2012 |

* cited by examiner

TOUCH PROCESSING METHOD AND ELECTRONIC DEVICE SUPPORTING SAME

PRIORITY

This application is a National Phase Entry of PCT International Application No. PCT/KR2017/006198 which was filed on Jun. 14, 2017, and claims priority to Korean Patent Application No. 10-2016-0074515, which was filed on Jun. 15, 2016, the content of each of which is incorporated herein by reference.

TECHNICAL FIELD

The present disclosure relates to a touch processing method and an electronic device supporting the same.

BACKGROUND ART

In recent years, the technology associated with a touch (a touch having a pressure value of a specified value or more, hereinafter referred to as a "force touch") that applies the pressure of a specified size or more has been actively developed. A force touch refers to a touch that applies a pressure of a specified magnitude or more to a display by using a touch object such as a user's body part (e.g., a finger) or an electronic pen (e.g., a stylus pen).

An electronic device that supports the processing of the force touch may sense not only a touch location but also touch strength, thereby providing the user with various interfaces. For example, when the force touch is sensed, the electronic device may output detailed information associated with the target object (e.g., content displayed in a screen area of a display corresponding to a touch location at which the force touch is input) of the force touch, to a screen.

DISCLOSURE

Technical Problem

However, an electronic device may only provide a method of providing detailed information about a target object at a point in time when a force touch is input, without providing a method of verifying the detailed information about the target object at a point in time that a user wants.

To solve the above-mentioned problems and tasks issued in the present disclosure, embodiments of the present disclosure provide a method of processing a touch that creates a widget including information associated with a target object of a force touch when a force touch is sensed and outputs the created widget to a specified screen, and an electronic device supporting the same.

Technical Solution

An electronic device according to an embodiment of the present disclosure may include a display configured to display at least one content, a pressure sensor configured to sense a touch input having a pressure value of a specified value or more, a memory, and a processor operatively connected to the display, the pressure sensor, and the memory. When the touch input occurs in a first screen of the display, the processor may be configured to determine an input location of the touch input, to verify content displayed at a display location of the first screen corresponding to the input location, to create a widget including information associated with the content, and to output the created widget to a second screen of the display.

In addition, a method of processing a touch of an electronic device according to an embodiment of the present disclosure may include sensing a touch input having a pressure value of a specified value or more in a first screen of a display, determining an input location of the touch input and verifying content displayed at a display location of the first screen corresponding to the input location, creating a widget including information associated with the content, and outputting the widget to a second screen of the display.

Advantageous Effects

According to an embodiment of the present disclosure, it is possible to provide an interface capable of verifying information associated with the target object at a point in time that a user wants, by creating a widget including information associated with a target object of a force touch and by outputting the widget to a specified screen.

Besides, a variety of effects directly or indirectly understood through this disclosure may be provided.

MODE FOR INVENTION

Figure 1:
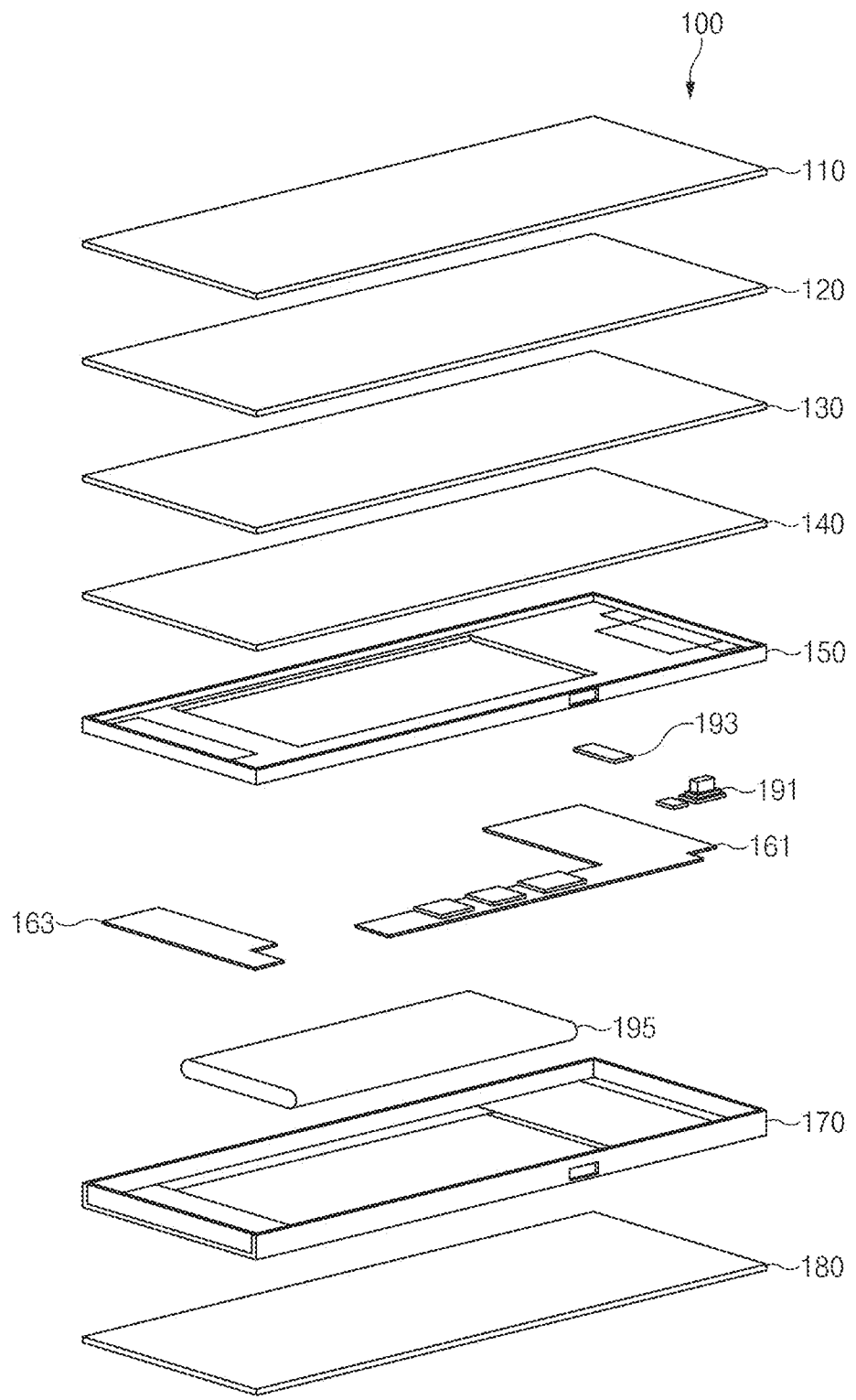
FIG. 1 is an exploded perspective view of an electronic device supporting processing of a force touch, according to an embodiment.

Various embodiments of the present disclosure may be described with reference to accompanying drawings. Embodiments and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A or/and B", and the like used herein may include any and all combinations of one or more of the associated listed items. Expressions such as "first," or "second," and the like, may express their components regardless of their priority or importance and may be used to distinguish one component from another component but is not limited to these components. When a (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "configured to" used herein may be interchangeably used as, for example, the expression "suitable for", "having the capacity to", "designed to", "adapted to", "made to", or "capable of". The expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

According to various embodiments of the present disclosure, an electronic device may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, medical devices, cameras, or wearable devices. A wearable device may include at least one of an accessory type of a device (e.g., a timepiece, a ring, a bracelet, an anklet, a necklace, glasses, a contact lens, or a head-mounted-device (HMD)), one-piece fabric or clothes type of a circuit (e.g., electronic clothes), a body-attached type of a circuit (e.g., a skin pad or a tattoo), or a bio-implantable type of a circuit. According to an embodiment, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, drones, automatic teller's machines (ATMs), points of sales (POSs), or internet of things (e.g., light bulbs, various sensors, sprinkler devices, fire alarms, thermostats, street lamps, toasters, exercise equipment, hot water tanks, heaters, boilers, and the like). According to another embodiment, the electronic devices may include at least one of parts of furniture, buildings/structures, or vehicles, electronic boards, electronic signature receiving devices, projectors, or various measuring instruments (e.g., water meters, electricity meters, gas meters, or wave meters, and the like). According to various embodiments, an electronic device may be a flexible electronic device or may be a combination of two or more of the above-described devices. An electronic device according to an embodiment of the present disclosure may not be limited to the above-described electronic devices. The term "user" used herein may refer to a person who uses an electronic device or may refer to a device (e.g., an artificial intelligence electronic device) that uses an electronic device.

FIG. 1 is an exploded perspective view of an electronic device supporting processing of a force touch, according to an embodiment.

Referring to FIG. 1, an electronic device 100 may include a front cover 110, a display, a bracket 150, a printed circuit board, housing 170, and a rear cover 180. However, a configuration of the electronic device 100 is not limited thereto. According to various embodiments, the electronic device 100 may omit at least one of the above-described components or may further include at least another component. For example, the electronic device 100 may not include the rear cover 180; in this case, the rear surface of the housing 170 may form the outer appearance of the rear surface of the electronic device 100.

The front cover 110 may be disposed on the display. The front cover 110 may be disposed in such a way that the front cover 110 covers the display and may form the outer appearance of the front surface of the electronic device 100. According to an embodiment, at least a partial area of the front cover 110 may be provided with transparent material (e.g., glass), and a screen output through the display may be displayed to the outside through a transparent area of the front cover 110.

The display may display various pieces of content (e.g., texts, images, video, icons, symbols, or the like) to a user. Furthermore, the display may include a touch screen and may receive, for example, a touch, gesture, proximity, or hovering input using an electronic pen or a part of a user's body.

The display may be provided as a plurality of layers. According to an embodiment, the display may include a touch sensing layer 120, a display layer 130, and a pressure sensing layer 140. However, the configuration of the display is not limited thereto. According to various embodiments, at least one of the above-described layers may be omitted in the display, and the display may further include at least another layer. For example, the display may further include a fingerprint recognition layer capable of discriminating a user's fingerprint, a heat blocking layer (e.g., heat sink) that blocks heat generated from the display or heat generated from other components of the electronic device 100, and the like.

The touch sensing layer 120 may sense the contact or the approach of a touch object (e.g., an electronic pen or a user's body part). The touch sensing layer 120 may include, for example, a touch sensor. For example, the touch sensing layer 120 may sense the contact or the approach of the touch object through the pressure scheme, the resistance scheme, the capacitive scheme, the infrared scheme, the sonic scheme, the optical scheme, the electromagnetic induction scheme, or the like.

According to an embodiment, the touch sensing layer 120 may be provided in the panel form. For example, the touch sensing layer 120 of the capacitive type may be a panel formed of a lattice structure in which sensing electrodes formed of a conductive material such as indium thin oxide (ITO), a metal mesh, or the like are disposed in the horizontal axis direction and the vertical axis direction. As such, the touch sensing layer 120 may detect a touch location by using a change in capacitance caused when the touch object contacts or approaches the sensing electrodes.

The touch sensing layer 120 may measure a physical quantity (e.g., variation in capacitance) changed due to the contact or the approach of the touch object and may transmit the measured physical quantity to a processor. In this case, the processor may analyze the physical quantity transmitted from the touch sensing layer 120 to determine whether a touch input occurs. Furthermore, the processor may determine the number of touch inputs, a location of a touch input, the occurrence time of the touch input, the duration of the touch input, and the like.

The display layer 130 may display a screen through color expression of the display elements. According to an embodiment, the display layer 130 may be provided in the panel form. The display layer 130 may have different structures and shapes depending on the scheme to express colors. For example, the display layer 130 may include a polymer layer, a plurality of display elements disposed on one surface of the polymer layer, and at least one conductive line electrically connected to the display elements.

The polymer layer may include polyimide. The plurality of display elements may be disposed on one surface of the polymer layer in a matrix form to form the pixels of the display layer 130. The plurality of display elements may include a fluorescent material, an organic fluorescent material capable of expressing colors, or the like. For example, each of the plurality of display elements may include an organic light emitting diode (OLED). The conductive line may form at least one gate signal line or at least one data signal line. According to an embodiment, a plurality of gate signal lines and a plurality of data signal lines are disposed in a matrix form, and the plurality of display elements may be disposed adjacent to points at which the lines are crossed so as to be electrically connected to each other.

The display layer 130 may be connected to a display driver IC (DDI). The DDI may be electrically connected to the conductive line. The DDI may include a driver IC providing the display layer 130 with a driving signal and an image signal or a timing controller (T-con) controlling the driving signal and the image signal. The driver IC may include a gate driver IC that sequentially selects the gate signal line to apply a scan signal (or a driving signal) and a data driver IC (or a source driver IC) that applies an image signal to the data signal line. According to an embodiment, when the gate driver IC selects the gate signal line and applies the scan signal to change the state of the corresponding display element to the activation state, the data driver IC may apply the image signal to the corresponding display element through the data signal line. The timing controller may control the transmission time of the signal transmitted to the driver IC, thereby preventing the difference of the display time of the screen.

For example, the pressure sensing layer 140 may detect the externally applied pressure and may convert the externally applied pressure to an electrical signal capable of being used for measurement or control. According to an embodiment, the pressure sensing layer 140 may include a pressure sensor. The pressure sensor may detect a pressure through a piezoresistive type, a piezoelectric type, a capacitance type, an inductance type, or the like. The piezoresistive method is a scheme that uses a property in which the resistance value of the resistor formed on the diaphragm is changed depending on the stress. The piezoelectric method is a scheme that detects a voltage generated by stress by applying a displacement or deformation to the piezoelectric element caused by the pressure. The capacitance method is a scheme that uses the property in which the capacitance between the diaphragm and the fixed electrode is changed depending on the bending degree of the diaphragm. The inductance method is a scheme that changes the inductance in the coil due to the displacement of the diaphragm to detect the change in the electromotive force induced in the coil. In addition, the pressure sensing layer 140 may include various types of pressure sensors.

According to various embodiments, at least one of the touch sensing layer 120 and the pressure sensing layer 140 may not be included in the display, but may be provided independently. For example, the pressure sensing layer 140 may be provided independently of the display and may be coupled in such a way that the pressure sensing layer 140 is stacked on the display. Moreover, an embodiment is exemplified in FIG. 1 as the touch sensing layer 120 is disposed on the display layer 130 and the pressure sensing layer 140 is disposed under the display layer 130. However, an embodiment is not limited thereto. According to various embodiments, the pressure sensing layer 140 may be disposed on the display layer 130 and may be integrated with the touch sensing layer 120.

The bracket 150 may provide a space in which a part of the components (e.g., display) included in the electronic device 100 is seated. The bracket 150 may include an insulating material; an adhesive material is applied to some areas of the bracket 150 or the bracket 150 may include an adhesive layer such that a part of the components of the electronic device 100 seated on the bracket 150 is capable of being fixed. According to an embodiment, the display may be seated on the front surface of the bracket 150; the front cover 110 may be coupled to the housing 170 in such a way that the front cover 110 covers a part of the front surface of the bracket 150.

According to various embodiments, the bracket 150 may include at least one opening. A part of components of the electronic device 100 seated on the bracket 150 may be connected to the printed circuit board through at least one opening formed in the bracket 150.

The printed circuit board may be disposed under the bracket 150. Various electronic parts may be mounted on the printed circuit board. For example, at least one electronic element, a circuit line, or the like may be mounted on the printed circuit board, and at least part of electronic parts mounted on the printed circuit board may be electrically connected to each other. For example, the electronic parts may include a processor, a memory, a communication module (e.g., communication circuit), a function module (e.g., a camera 191, a speaker 193, or the like), or the like.

According to various embodiments, the printed circuit board may be provided integrally, or a plurality of the printed circuit boards may be provided separately. An embodiment is exemplified in FIG. 1 as the electronic device 100 includes a first printed circuit board 161 and a second printed circuit board 163. When the electronic device 100 includes a plurality of printed circuit boards, some of the plurality of printed circuit boards may be electrically connected to each other. For example, the first printed circuit board 161 and the second printed circuit board 163 may be electrically connected to each other.

The processor may perform operations or data processing associated with control and/or communication of at least another component of the electronic device 100. The processor may drive, for example, an operating system (OS) or an application to control a plurality of hardware or software components connected to the processor and to process a variety of data. The processor may include one or more of a central processing unit (CPU), an application processor (AP), or a communication processor (CP). The processor may be implemented with a System on Chip (SoC).

When a touch (a touch having a pressure value of a specified value or more, hereinafter referred to as a "force touch") that applies the pressure of a specified size or more based on the pressure sensing layer 140 is input, the processor may create a widget including information associated with the target object of the force touch. The widget is a small program that supports only some functions of the application and may be configured to easily access frequently used functions supported by the application. For example, the widget may include at least one of visual information associated with some functions of the application and a function button configured to perform the function. As such, a user may easily verify information associated with the frequently used function through the visual information included in the widget and may allow the frequently used function to be performed by selecting the function button as needed.

The processor may output the created widget to a specified screen. According to an embodiment, the processor may output the widget to a home screen. However, a screen in which the widget is output is not limited thereto. The screen in which the widget is output may be changed depending on settings of the user. For example, the screen in which the widget is output may be a lock screen.

According to various embodiments, when a force touch is input, the processor may provide the user with an interface for verifying the determination of creating the widget, before creating the widget. For example, the processor may output a display object (e.g., a pop-up, a card view, or the like) including a button object disposed to be selected when the user agrees to create the widget, to the display.

According to various embodiments, the display object may include not only a button object but also detailed information associated with the target object of the force touch. The detailed information associated with the target object may be output in various forms depending on the type of the target object. For example, when the target object is associated with multimedia content such as a video or the like, the display object may include a controller capable of executing the multimedia content. As such, the user may execute the multimedia content in advance to verify the target object.

According to various embodiments, when a plurality of widgets are created, the processor may classify and manage the plurality of widgets for each type of content associated with the widget. For example, the processor may create a folder classified for type of the content and may include the widget in the folder.

The memory may include a volatile memory and/or a nonvolatile memory. For example, the memory may store commands or data associated with at least one other component(s) of the electronic device 100. According to an embodiment, the memory may store software and/or a program. The program may include an application. The application may be a set of a series of programs (or instructions) for performing at least one specified function; the application may include, for example, a message application, an alarm application, a contact information management application, a search application, a mail application, a web search application, or the like. The memory may include an internal memory or an external memory.

The communication module may establish communication between the electronic device 100 and an external device. For example, the communication module may connect to a network through wireless communications or wired communications to communicate with the external device.

The function module may perform at least one function among functions provided by the electronic device 100. For example, the function module may include the camera 191 performing a capture function, the speaker 193 (or a receiver) outputting sound, or the like.

The housing 170 may fix and support internal elements of the electronic device 100. According to an embodiment, the display, the bracket 150, and the printed circuit board may be stacked sequentially and may be seated on the housing 170. Furthermore, at least one of the function modules may be seated on the housing 170 so as to be fixed.

The housing 170 may include a front surface, a rear surface, and a side surface at least partially surrounding a space between the front surface and the rear surface. According to an embodiment, the opening passing through the front surface and the rear surface may be formed in the housing 170 such that a battery 195 is removable; however, an embodiment is not limited thereto. In any embodiment, since the battery 195 is provided integrally with the electronic device 100, the opening passing through the front surface and the rear surface may not be formed in the housing 170. At least one through-hole (or an interfacing hole) may be formed on the side surface of the housing 170. At least one of the function modules may be exposed to the outside through the through-hole.

The battery 195 may supply power to the components included in the electronic device 100. For example, the battery 195 may be electrically connected to the printed circuit board, and may supply power to the electronic parts mounted on the printed circuit board. The battery 195 may be seated inside the housing 170. According to various embodiments, the battery 195 may be provided integrally with the electronic device 100 or may be provided to be removable.

The rear cover 180 may form an outer appearance of the rear surface of the electronic device 100. For example, the rear cover 180 may be coupled to the housing 170 in a state where the rear cover 180 covers the rear surface of the housing 170. According to various embodiments, the rear cover 180 may be removable from the housing 170.

Figure 2:
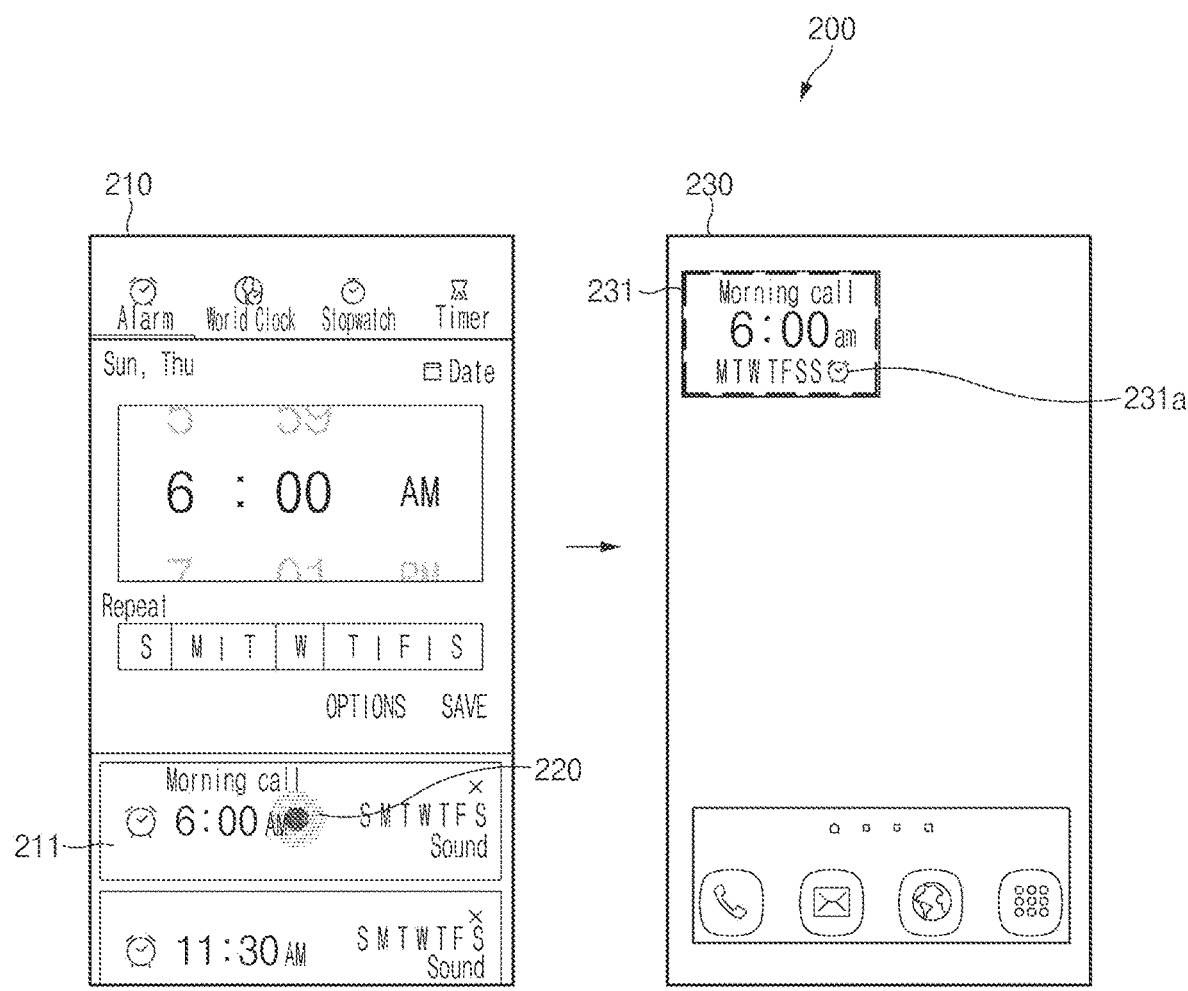
FIG. 2 is a view for describing a method for creating a widget corresponding to a force touch, according to an embodiment.

FIG. 2 is a view for describing a method for creating a widget corresponding to a force touch, according to an embodiment.

Referring to FIG. 2, an electronic device 200 may output an execution screen 210 of an application. For example, the execution screen 210 of the application may be an execution screen of a function among functions supported by the application. The execution screen 210 of an application may include at least one content 211 associated with the function.

When a force touch 220 is input, the electronic device 200 may verify the target object of the force touch 220. According to an embodiment, the electronic device 200 may determine the touch location of the force touch 220 and may designate the content 211 displayed in an area, which corresponds to a touch location in the execution screen 210 of the application, as the target object.

When the target object is designated, the electronic device 200 may create a widget 231 including information associated with the target object. The widget 231 may further include a function button 231a configured to perform a function associated with the target object. In any embodiment, a function associated with the target object may be performed when an input (e.g., an input to touch the widget 231) to select the widget 231 occurs. For another example, the electronic device 200 may execute an application capable of performing a function associated with the target object, in response to the input to select the widget 231.

The electronic device 200 may output the created widget 231 to a specified screen 230. The specified screen 230 may be designated by the system setting information or settings of a user. According to an embodiment, the specified screen 230 may be a home screen, a lock screen, or the like.

Figure 3:
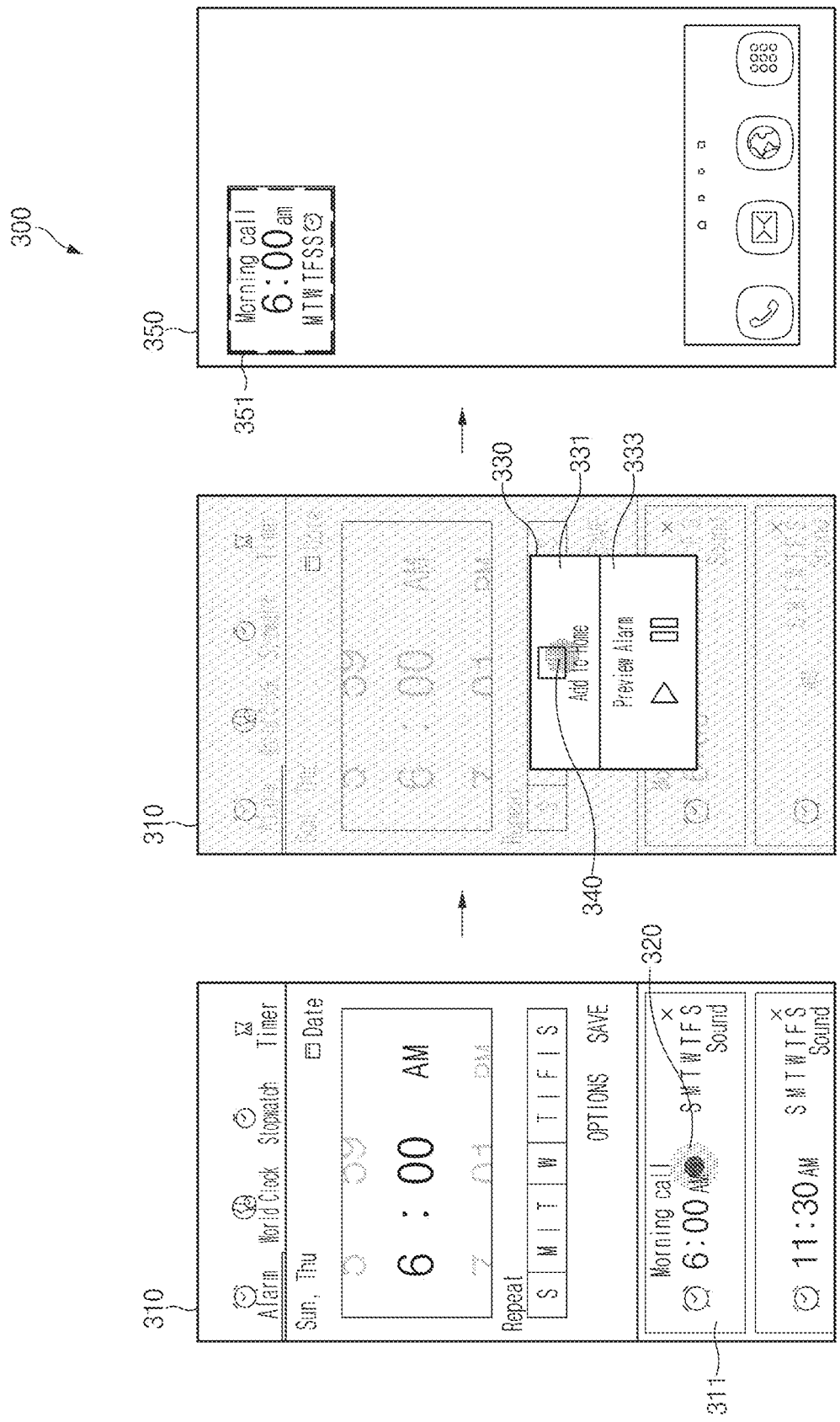
FIG. 3 is a view for describing a method of providing an interface for verifying determination of creating a widget, according to an embodiment.

FIG. 3 is a view for describing a method of providing an interface for verifying determination of creating a widget, according to an embodiment. According to various embodiments, when a force touch 320 is input, an electronic device 300 may provide a user with an interface for verifying the determination of creating a widget 351, before creating the widget 351.

Referring to FIG. 3, when the force touch 320 on content 311 included in an execution screen 310 of an application is input, the electronic device 300 may be designate the content 311 as a target object and may output a display object 330 for verifying the determination whether to create the widget 351 including information associated with the target object.

The display object 330 may be output in various forms such as a pop-up or a card view. The display object 330 may be output on the execution screen 310 of the application. In this case, the execution screen 310 of the application may be dimmed. The display object 330 may include a button object 331 configured to create the widget 351. According to various embodiments, the display object 330 may include detailed information 333 associated with the target object. The detailed information 333 associated with the target object may be output in various forms depending on the type of the target object. For example, when the target object is associated with multimedia content such as a video, audio, or the like, the detailed information 333 associated with the target object may include a controller capable of executing the multimedia content. As illustrated in FIG. 3, when the target object is associated with audio content such as an alarm, the detailed information 333 associated with the target object may include an audio playing controller for listening to the alarm in advance.

When an input 340 to select the button object 331 configured to create the widget 351, the electronic device 300 may create the widget 351 and may output the created widget 351 to a specified screen 350. According to various embodiments, when the button object 331 is selected, the electronic device 300 may terminate the output of the execution screen 310 of an application and may output the specified screen 350 including the widget 351. Alternatively, even though the button object 331 is selected, the electronic device 300 may maintain the output of the execution screen 310 of an application.

Figure 4:
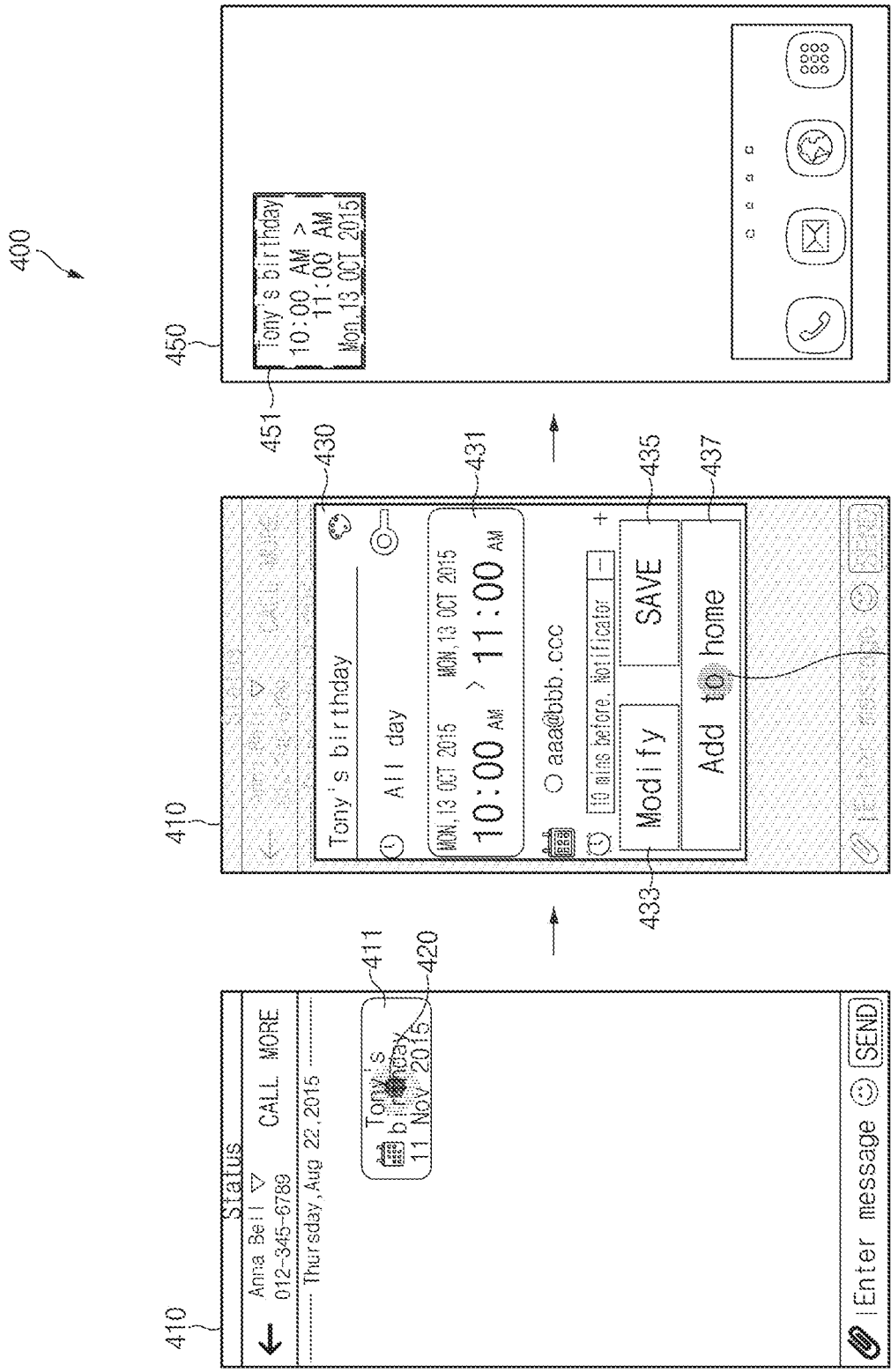
FIG. 4 is a view for describing a method of processing a force touch on alarm-related content transmitted or received by using a message application, according to an embodiment.
Figure 5:
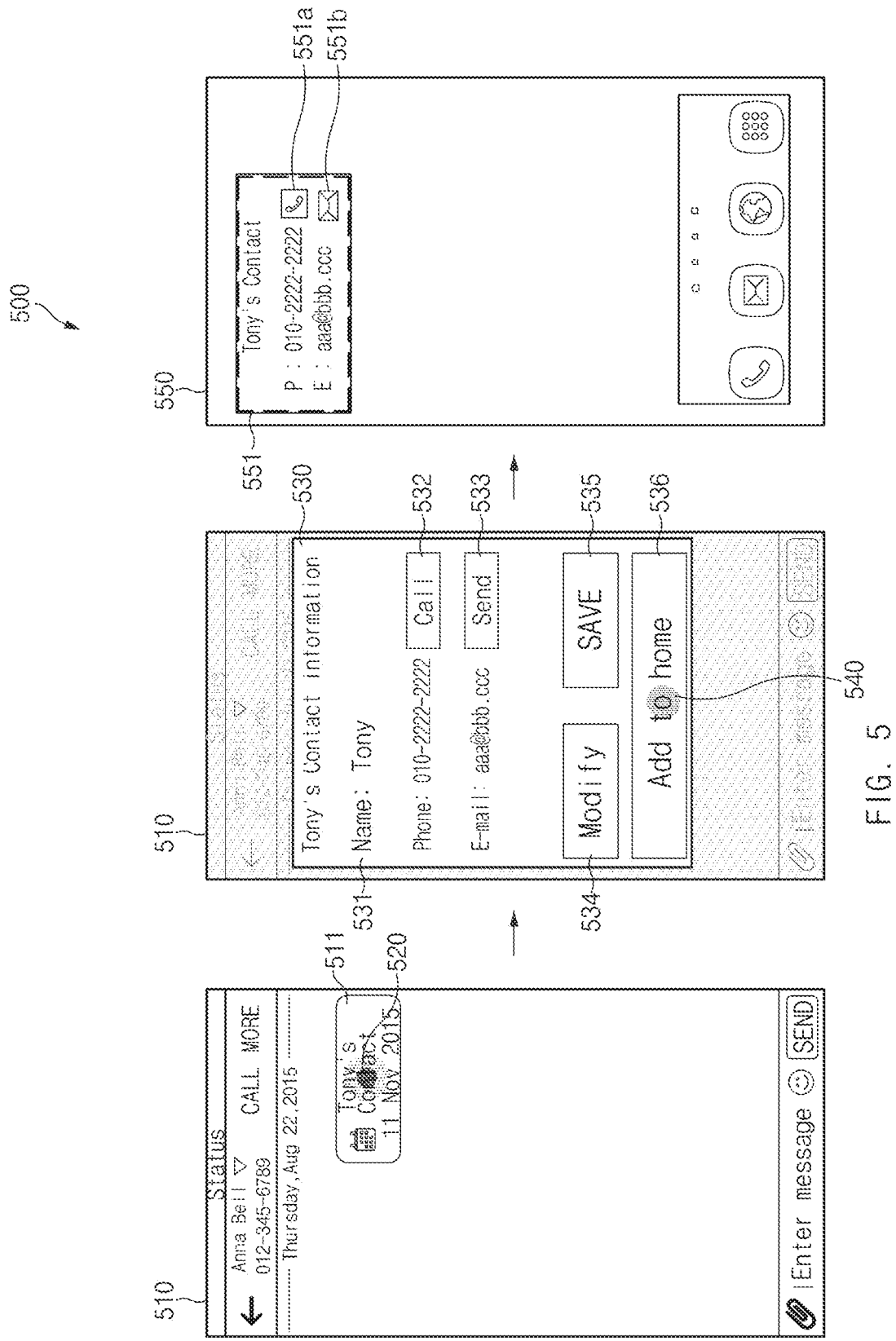
FIG. 5 is a view for describing a method of processing a force touch on contact information-related content transmitted or received by using a message application, according to an embodiment.

In embodiments described below, a method for processing a force touch created in the execution screens of various applications will be described. In FIGS. 4 and 5, the method of processing a force touch created in the execution screen of a message application is described; in FIGS. 6 to 9, the method of processing a force touch generated in the execution screen of a search application is described; in FIGS. 10 and 11, the method of processing a force touch generated in the execution screen of a web search application is described. However, the type of an application is not limited thereto. The application mentioned in the embodiment described below may be an application selected to help understanding of the present disclosure, and an application to which the present disclosure is applied may correspond to any application included in the electronic device.

FIG. 4 is a view for describing a method of processing a force touch on alarm-related content transmitted or received by using a message application, according to an embodiment.

Referring to FIG. 4, an electronic device 400 may process a force touch 420 to alarm-related content 411 transmitted or received by using a message application. The electronic device 400 may output a message transmitted or received to or from an execution screen 410 of a message application. The message may include various pieces of content. For example, the message may include a text, an image, a video, an icon, a symbol, or the like. FIG. 4 illustrates that the message includes the alarm-related content 411.

When the force touch 420 on the alarm-related content 411 is input, the electronic device 400 may create a widget 451 including information associated with the alarm-related content 411. According to various embodiments, the electronic device 400 may output a display object 430 for verifying the determination of creating the widget 451, before creating the widget 451. For example, the display object 430 may include an alarm time 431, an alarm information modifying button 433, an alarm information saving button 435, a widget creation verifying button 437, or the like. When the alarm information modifying button 433 is selected, the electronic device 400 may provide an interface that makes it possible to modify the alarm time 431, or the like. When the alarm information saving button 435 is selected, the electronic device 400 may store the set alarm information in a memory.

When an input 440 to select the widget creation verifying button 437 is received, the electronic device 400 may create the widget 451 and may output the created widget 451 to a specified screen 450.

FIG. 5 is a view for describing a method of processing a force touch on contact information-related content transmitted or received by using a message application, according to an embodiment.

Referring to FIG. 5, an electronic device 500 may process a force touch 520 to contact information-related content 511 transmitted or received by using a message application. when the force touch 520 on the contact information-related content 511 included in an execution screen 510 of a message application is input, the electronic device 500 may create a widget 551 including information associated with the contact information-related content 511. According to various embodiments, the electronic device 500 may output a display object 530 for verifying the determination of creating the widget 551, before creating the widget 551. For example, the display object 530 may include contact information 531, a phone connecting button 532, a mail sending button 533, a contact information modifying button 534, a contact information saving button 535, a widget creation verifying button 536, or the like. The contact information 531 may include a contact telephone number, a contact mail address, or the like. When the phone connecting button 532 is selected, the electronic device 500 may execute a phone application; when the mail sending button 533 is selected, the electronic device 500 may execute a mail application. When the contact information modifying button 534 is selected, the electronic device 500 may provide an interface that makes it possible to modify contact information. When the contact information saving button 535 is selected, the electronic device 500 may store the set contact information in a memory.

When an input 540 to select the widget creation verifying button 536 is received, the electronic device 500 may create the widget 551 and may output the created widget 551 to a specified screen 550. The widget 551 may include a part of the contact information and may further include a phone connecting button 551a or a mail sending button 551b.

According to various embodiments, when a force touch on various pieces of content occurs in addition to the alarm-related content 411 and the contact information-related content 511, which are transmitted or received by using a message application, the force touch may be processed in the manner the same as or similar to the above-described manner. For example, when a force touch on the message transmitted or received by using a message application occurs, an electronic device may create a widget including the message to output the created widget to a specified screen.

Figure 6:
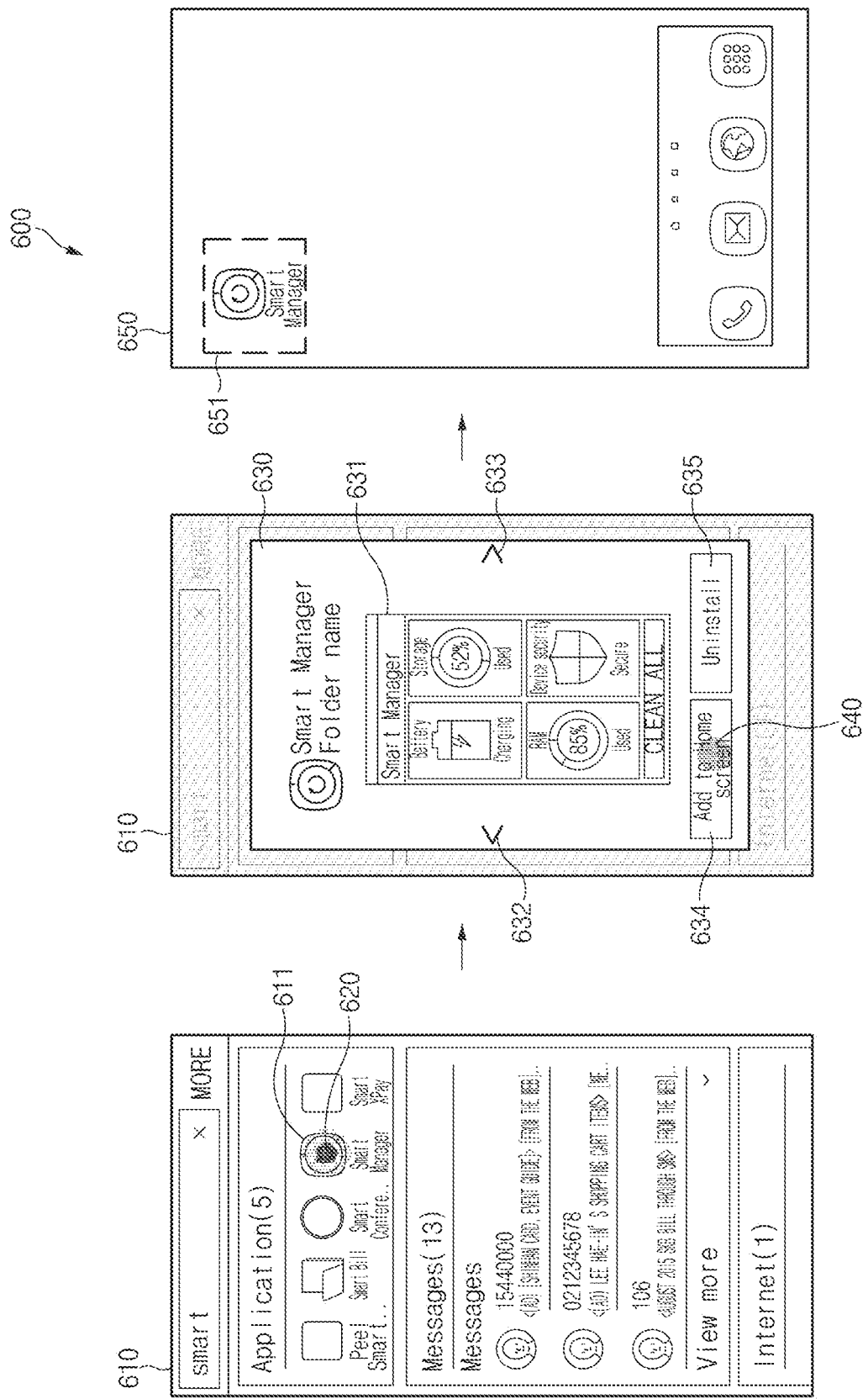
FIG. 6 is a view for describing a method of processing a force touch on an application list found by using a search application, according to an embodiment.

FIG. 6 is a view for describing a method of processing a force touch on an application list found by using a search application, according to an embodiment.

Referring to FIG. 6, an electronic device 600 may output an execution screen 610 of a search application including an application list. The application list may include an application item 611 corresponding to at least one application included in the electronic device 600.

The electronic device 600 may process a force touch 620 on the application item 611 included in the application list. When the force touch 620 on the application item 611 is input, the electronic device 600 may create a widget 651 including information associated with the application item 611. For example, the widget 651 may include an execution icon of an application corresponding to the application item 611.

According to various embodiments, the electronic device 600 may output a display object 630 for verifying the determination of creating the widget 651, before creating the widget 651. For example, the display object 630 may include application information 631, a previous item selecting button 632, a next item selecting button 633, a widget creation verifying button 634, an application uninstalling button 635, or the like. When the previous item selecting button 632 is selected, the electronic device 600 may display the previous item of the application item 611, which is currently selected, from among the application items included in the application list. When the next item selecting button 633 is selected, the electronic device 600 may display the next item of the application item 611, which is currently selected, from among the application items included in the application list. When the application uninstalling button 635 is selected, the electronic device 600 may uninstall the selected application.

When an input 640 to select the widget creation verifying button 634 is received, the electronic device 600 may create the widget 651 and may output the created widget 651 to a specified screen 650.

Figure 7:
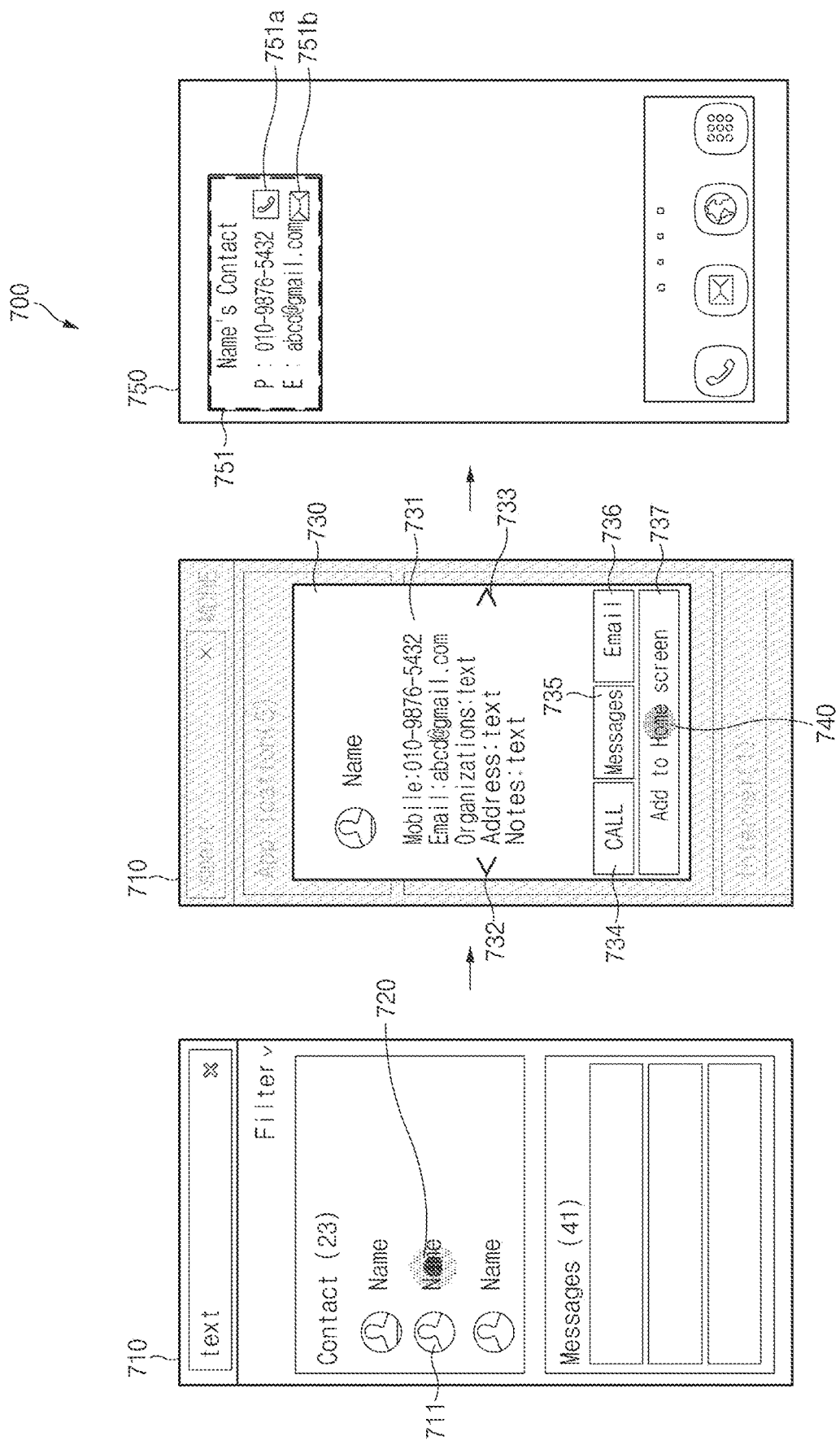
FIG. 7 is a view for describing a method of processing a force touch on a found contact list by using a search application, according to an embodiment.

FIG. 7 is a view for describing a method of processing a force touch on a found contact list by using a search application, according to an embodiment.

Referring to FIG. 7, an electronic device 700 may output an execution screen 710 of a search application including a contact list. The contact list may include a contact item 711 corresponding to at least one contact information stored in the electronic device 700.

The electronic device 700 may process a force touch 720 on the contact item 711 included in the contact list. When the force touch 720 on the contact item 711 is input, the electronic device 700 may create a widget 751 including information associated with the contact item 711. For example, the widget 751 may include contact information corresponding to the contact item 711, a phone connecting button 751a, a mail sending button 751b, or the like.

According to various embodiments, the electronic device 700 may output a display object 730 for verifying the determination of creating the widget 751, before creating the widget 751. For example, the display object 730 may include contact information 731, a previous item selecting button 732, a next item selecting button 733, a phone connecting button 734, a message sending button 735, a mail sending button 736, a widget creation verifying button 737, or the like. When the previous item selecting button 732 is selected, the electronic device 700 may display the previous item of the contact item 711, which is currently selected, from among contact items included in the contact list. When the next item selecting button 733 is selected, the electronic device 700 may display the next item of the contact item 711, which is currently selected, from among contact items included in the contact list. When the phone connecting button 734 is selected, the electronic device 700 may execute a phone application; when the message sending button 735 is selected, the electronic device 700 may execute a message application; when the mail sending button 736 is selected, the electronic device 700 may execute a mail application.

When an input 740 to select the widget creation verifying button 737 is received, the electronic device 700 may create the widget 751 and may output the created widget 751 to a specified screen 750.

Figure 8:
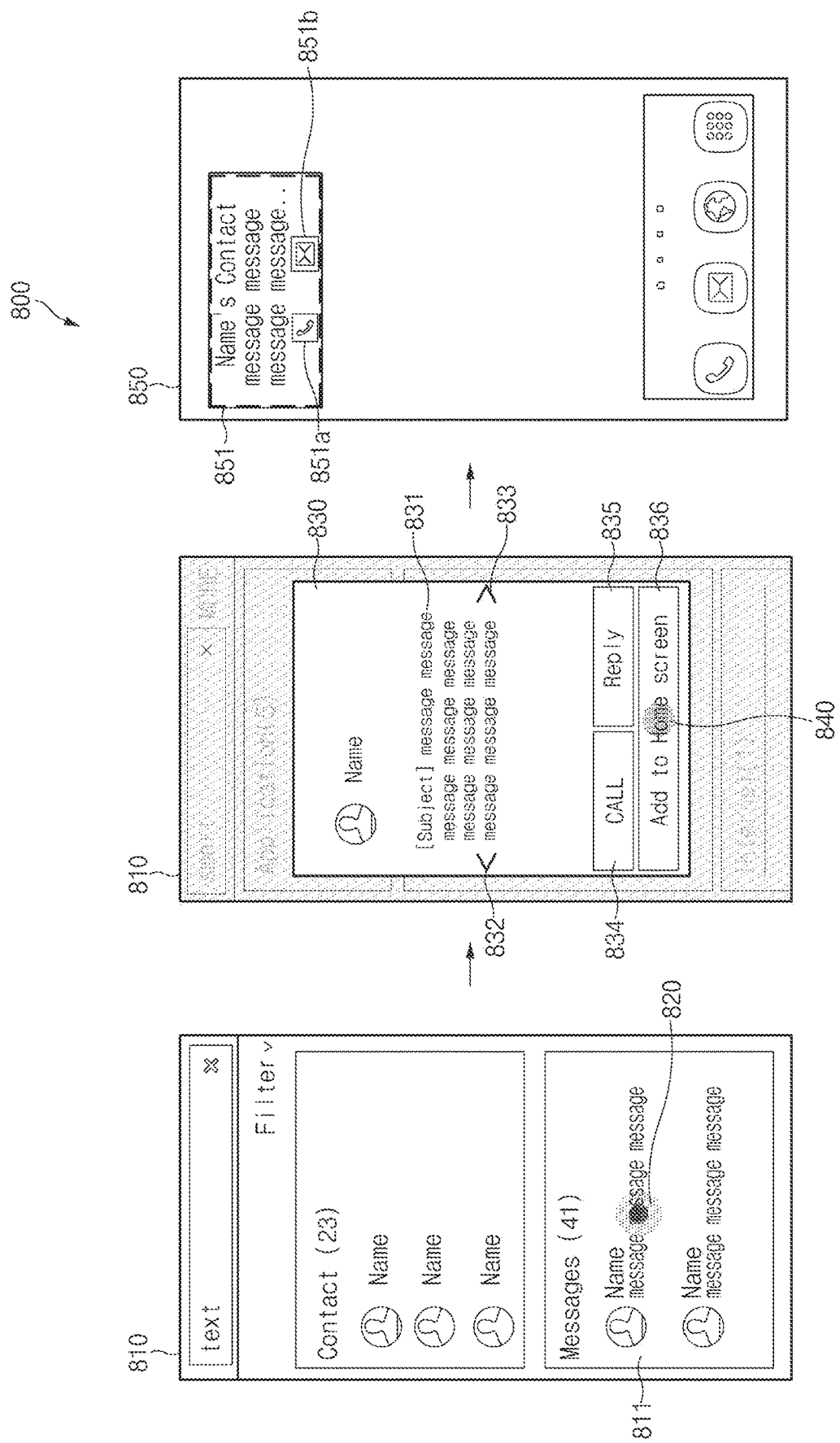
FIG. 8 is a view for describing a method of processing a force touch on a found message list by using a search application, according to an embodiment.

FIG. 8 is a view for describing a method of processing a force touch on a found message list by using a search application, according to an embodiment.

Referring to FIG. 8, an electronic device 800 may output an execution screen 810 of a search application including a message list. The message list may include a message item 811 corresponding to at least one message stored in the electronic device 800.

The electronic device 800 may process a force touch 820 on the message item 811 included in the message list. When the force touch 820 on the message item 811 is input, the electronic device 800 may create a widget 851 including information associated with the message item 811. For example, the widget 851 may include message information corresponding to the message item 811, a phone connecting button 851a, a message sending button 851b, or the like.

According to various embodiments, the electronic device 800 may output a display object 830 for verifying the determination of creating the widget 851, before creating the widget 851. For example, the display object 830 may include message information 831, a previous item selecting button 832, a next item selecting button 833, a phone connecting button 834, a message sending button 835, a widget creation verifying button 836, or the like. The message information 831 may include counterpart information, message content, or the like. When the previous item selecting button 832 is selected, the electronic device 800 may display the previous item of the message item 811, which is currently selected, from among message items included in the message list. When the next item selecting button 833 is selected, the electronic device 800 may display the next item of the message item 811, which is currently selected, from among message items included in the message list. When the phone connecting button 834 is selected, the electronic device 800 may execute a phone application; when the message sending button 835 is selected, the electronic device 500 may execute a message application.

When an input 840 to select the widget creation verifying button 836 is received, the electronic device 800 may create the widget 851 and may output the created widget 851 to a specified screen 850.

Figure 9:
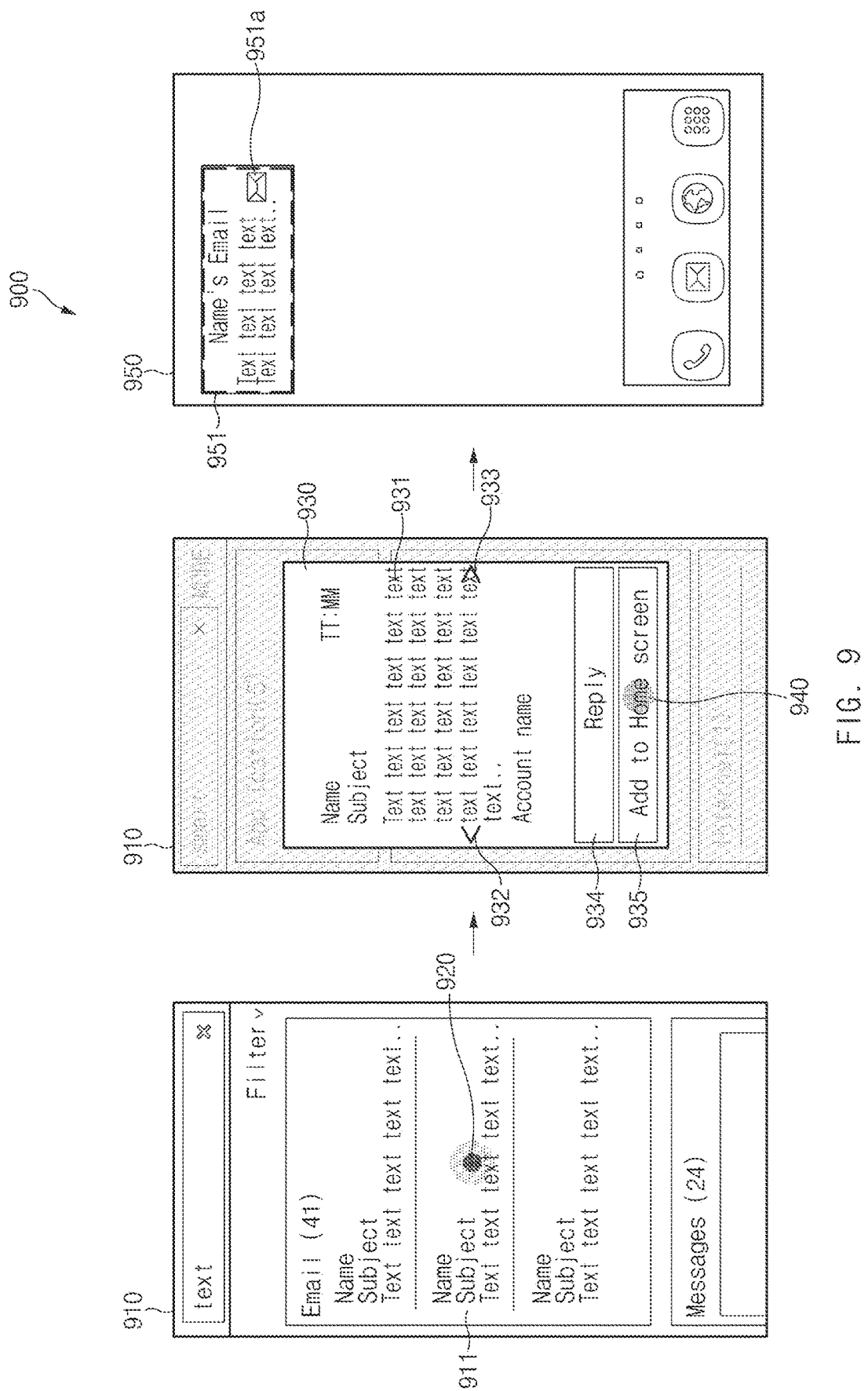
FIG. 9 is a view for describing a method of processing a force touch on a found mail list by using a search application, according to an embodiment.

FIG. 9 is a view for describing a method of processing a force touch on a found mail list by using a search application, according to an embodiment.

Referring to FIG. 9, an electronic device 900 may output an execution screen 910 of a search application including a mail list. The mail list may include a mail item 911 corresponding to at least one mail stored in the electronic device 900.

The electronic device 900 may process a force touch 920 on the mail item 911 included in the mail list. When the force touch 920 on the mail item 911 is input, the electronic device 900 may create a widget 951 including information associated with the mail item 911. For example, the widget 951 may include mail information corresponding to the mail item 911, a mail sending button 951a, or the like.

According to various embodiments, the electronic device 900 may output a display object 930 for verifying the determination of creating the widget 951, before creating the widget 951. For example, the display object 930 may include mail information 931, a previous item selecting button 932, a next item selecting button 933, a mail sending button 934, a widget creation verifying button 935, or the like. The mail information 931 may include counterpart information, mail content, or the like. When the previous item selecting button 932 is selected, the electronic device 900 may display the previous item of the mail item 911, which is currently selected, from among mail items included in the mail list. When the next item selecting button 933 is selected, the electronic device 900 may display the next item of the mail item 911, which is currently selected, from among mail items included in the mail list. When the mail sending button 934 is selected, the electronic device 500 may execute a mail application.

When an input 940 to select the widget creation verifying button 935 is received, the electronic device 900 may create the widget 951 and may output the created widget 951 to a specified screen 950.

According to various embodiments, when a force touch on various pieces of content occurs in addition to the application list, the contact list, the message list, and the mail list, which are found by using the search application, the force touch may be processed in the manner the same as or similar to the above-described manner. For example, when a force touch on a document, a photo, a video, or the like, which is found by using the search application, occurs, the electronic device may create a widget including the selected document, photo, video, or the like to output the created widget to a specified screen.

Figure 10:
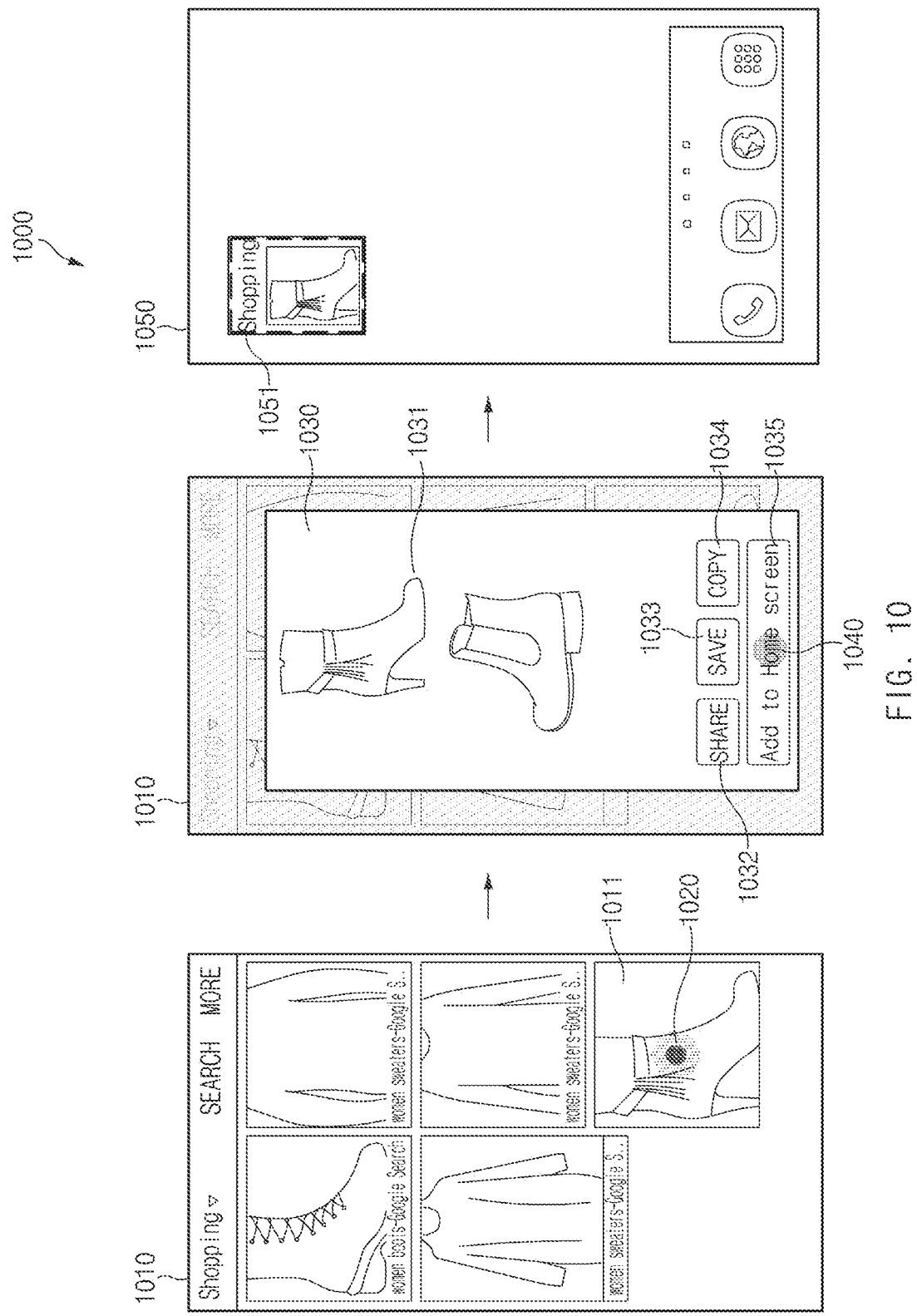
FIG. 10 is a view for describing a method of processing a force touch on a found shopping list by using a search application, according to an embodiment.

FIG. 10 is a view for describing a method of processing a force touch on a found shopping list by using a search application, according to an embodiment.

According to various embodiments, an electronic device 1000 may include a search application that searches for content stored in the electronic device 1000, but also a web search application that searches for content stored in an external electronic device (e.g., a web server). The electronic device 1000 may support a force touch on the content found through the web search application, in the manner the same as or similar to the case of the above-described search application.

Referring to FIG. 10, the electronic device 1000 may output an execution screen 1010 of the web search application including a shopping list. The shopping list may be information included in a web page provided by a web server; the shopping list may include at least one shopping item 1011.

The electronic device 1000 may process a force touch 1020 on the shopping item 1011 included in the shopping list. When the force touch 1020 on the shopping item 1011 is input, the electronic device 1000 may create a widget 1051 including information associated with the shopping item 1011. For example, the widget 1051 may include goods information corresponding to the shopping item 1011.

According to various embodiments, the electronic device 1000 may output a display object 1030 for verifying the determination of creating the widget 1051, before creating the widget 1051. For example, the display object 1030 may include goods information 1031, a goods information sharing button 1032, a goods information saving button 1033, a goods information copying button 1034, a widget creation verifying button 1035, or the like. The goods information 1031 may include an image (or a video) for the goods to be purchased, a text such as a price, or the like. When the goods information sharing button 1032 is selected, the electronic device 1000 may execute a sharing application that supports a service social network service (SNS). When the goods information saving button 1033 is selected, the electronic device 100 may store the goods information 1031 in a memory; when the goods information copying button 1034 is selected, the electronic device 100 may store the goods information 1031 in a clipboard.

When an input 1040 to select the widget creation verifying button 1035 is received, the electronic device 1000 may create the widget 1051 and may output the created widget 1051 to a specified screen 1050. According to various embodiments, when an input to select the widget 1051 occurs, the electronic device 1000 may be connected to the web server providing the shopping item 1011 to output the corresponding web page.

Figure 11:
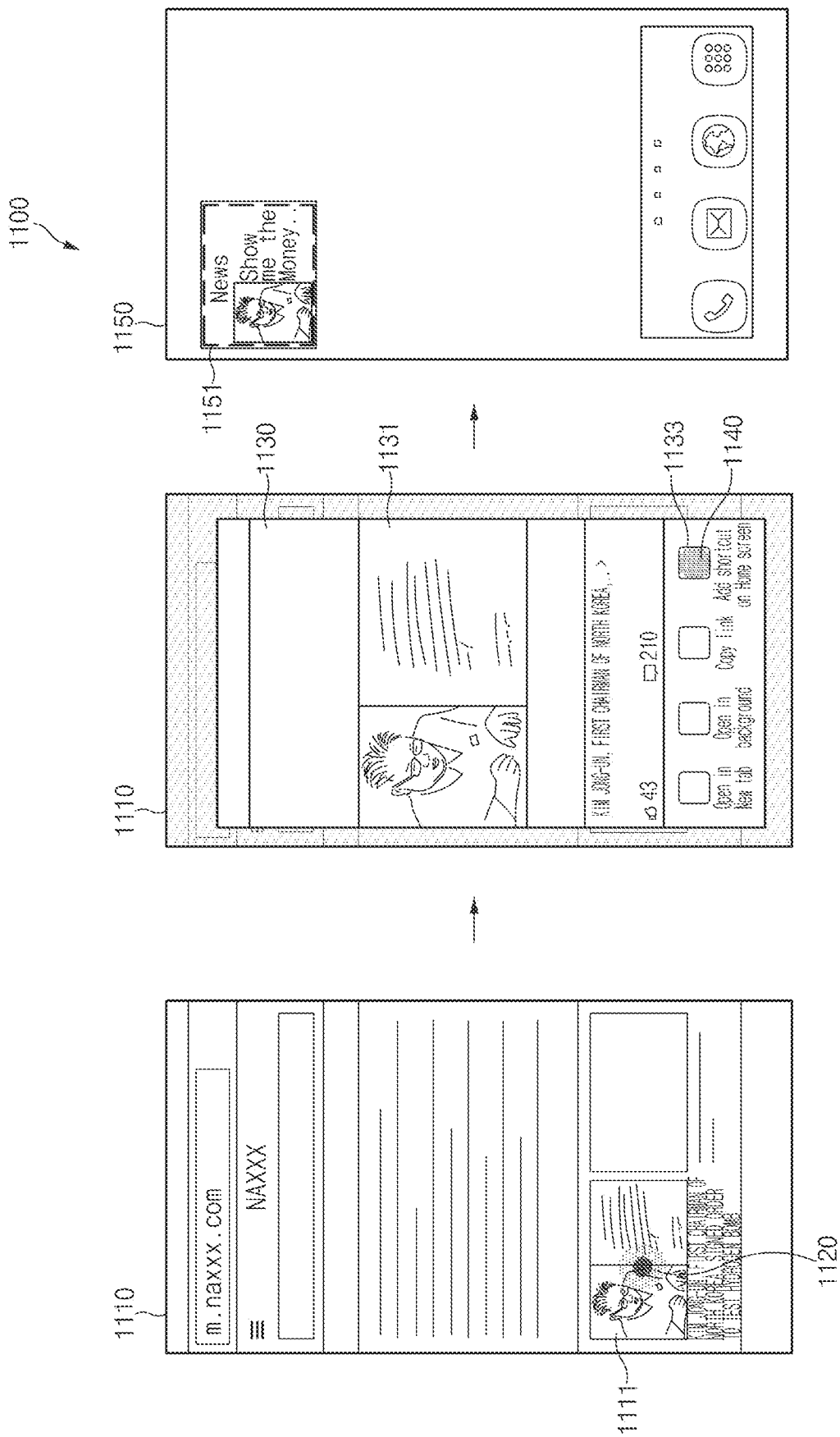
FIG. 11 is a view for describing a method of processing a force touch on a found news list by using a search application, according to an embodiment.

FIG. 11 is a view for describing a method of processing a force touch on a found news list by using a search application, according to an embodiment.

Referring to FIG. 11, an electronic device 1100 may output an execution screen 1110 of the web search application including a news list. The news list may be information included in a web page provided by a web server; the news list may include at least one news item 1111.

The electronic device 1100 may process a force touch 1120 on the news item 1111 included in the news list. When the force touch 1120 on the news item 1111 is input, the electronic device 1100 may create a widget 1151 including information associated with the news item 1111. For example, the widget 1151 may include news information corresponding to the news item 1111.

According to various embodiments, the electronic device 1100 may output a display object 1130 for verifying the determination of creating the widget 1151, before creating the widget 1151. For example, the display object 1130 may include news information 1131 or a widget creation verifying button 1133, or the like. The news information 1131 may include an image (or video) for the selected news, news content, or the like.

When an input 1140 to select the widget creation verifying button 1133 is received, the electronic device 1100 may create the widget 1151 and may output the created widget 1151 to a specified screen 1150. According to various embodiments, when an input to select the widget 1151 occurs, the electronic device 1100 may be connected to the web server providing the news item 1111 to output the corresponding web page.

According to various embodiments, when a force touch on various pieces of content occurs in addition to the shopping list and the news list, which are found by using the web search application, the force touch may be processed in the manner the same as or similar to the above-described manner. For example, when a force touch on a document, a photo, a video, or the like, which is found by using the web search application, occurs, the electronic device may create a widget including the selected document, photo, video, or the like to output the created widget to a specified screen.

Figure 12:
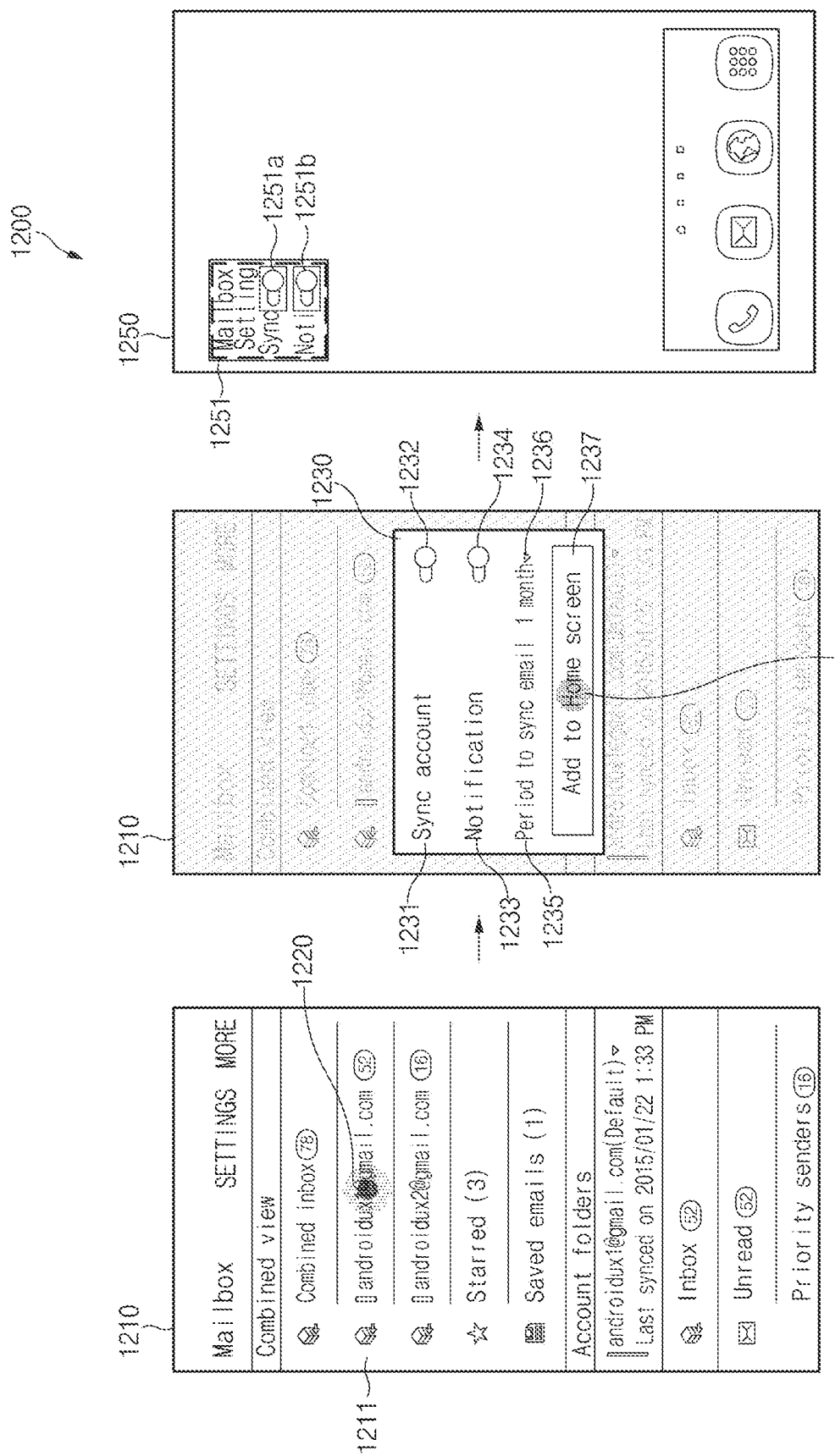
FIG. 12 is a view for describing a method of processing a force touch on a mail account, according to an embodiment.

FIG. 12 is a view for describing a method of processing a force touch on a mail account, according to an embodiment.

Referring to FIG. 12, an electronic device 1200 may output a mail account managing screen 1210. The mail account managing screen 1210 may be a function execution screen of the mail application. The mail account managing screen 1210 may include an account list including at least one account item 1211 subscribing to the corresponding mail.

The electronic device 1200 may process a force touch 1220 on an account item 1211 included in the account list. When the force touch 1220 on the account item 1211 is input, the electronic device 1200 may create a widget 1251 including information associated with the account item 1211. For example, the widget 1251 may include account information corresponding to the account item 1211 and an account setting button. For example, the account setting button may include a synchronization setting button 1251*a*, a notification setting button 1251*b*, or the like.

According to various embodiments, the electronic device 1200 may output a display object 1230 for verifying the determination of creating the widget 1251, before creating the widget 1251. For example, the display object 1230 may include an account-related synchronization item 1231, a synchronization setting button 1232, a notification item 1233, a notification setting button 1234, a synchronization period item 1235, a synchronization period setting button 1236, a widget creation verifying button 1237, or the like. Each of the account-related synchronization item 1231, the notification item 1233, and the synchronization period item 1235 may include a text associated with the corresponding setting item. When the synchronization setting button 1232 is selected, the electronic device 1200 may select whether to synchronize a mail associated with account; when the notification setting button 1234 is selected, the electronic device 1200 may select whether to provide a notification of mail reception; when the synchronization period setting button 1236 is selected, the electronic device 1200 may provide an interface capable of setting a synchronization period of a mail.

When an input 1240 to select the widget creation verifying button 1237 is received, the electronic device 1200 may create the widget 1251 and may output the created widget 1251 to a specified screen 1250. According to various embodiments, when an input to select the widget 1251 occurs, the electronic device 1200 may output the mail account managing screen 1210.

According to various embodiments, the electronic device 1200 may output a setting screen associated with another application installed in the electronic device 1200, in addition to the mail account managing screen 1210. When a force touch on the setting information included in the setting screen occurs, the electronic device 1200 may process the force touch in the manner the same as or similar to the above-described manner.

Figure 13:
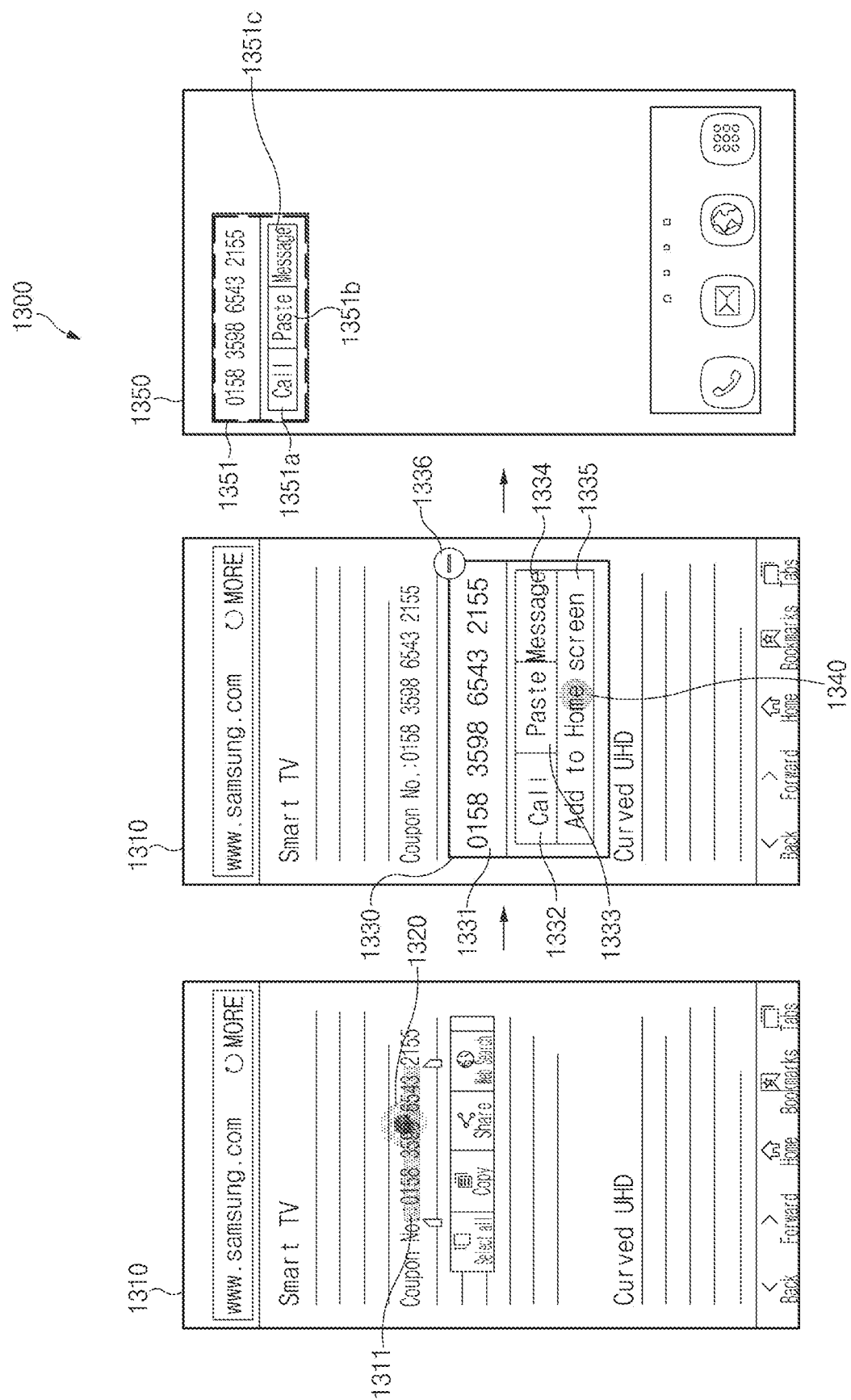
FIG. 13 is a view for describing a method of processing a force touch on indicated content, according to an embodiment.

FIG. 13 is a view for describing a method of processing a force touch on indicated content, according to an embodiment.

Referring to FIG. 13, an electronic device 1300 may output a screen 1310 including various pieces of content. For example, FIG. 13 illustrates that a web page composed of texts is output. According to various embodiments, when a specified user input occurs, the electronic device 1300 may control the screen 1310 such that at least one content 1311 is indicated. For example, when an input to touch the screen 1310 occurs during a specified time period or more, the electronic device 1300 may provide an interface that allows the content 1311 included in the screen 1310 to be indicated. According to an embodiment, when the at least one content 1311 among pieces of content included in the screen 1310 is indicated, the electronic device 1300 may support a function of copying, sharing, or searching for the indicated content 1311.

The electronic device 1300 may process a force touch 1320 on the indicated content 1311. When the force touch 1320 on the indicated content 1311 is input, the electronic device 1300 may create a widget 1351 including information associated with the indicated content 1311. For example, the widget 1351 may include information of content corresponding to the indicated content 1311 and the execution button of the content. For example, the execution button of the content may include the execution button of an application associated with the information of the content. FIG. 13 illustrates that the content 1311 is a number; FIG. 13 illustrates that the information of the content is the corresponding number and a phone connecting button 1351*a* associated with the number, a pasting button 1351*b* of the corresponding number, and a message sending button 1351*c* are output to the execution button of the content. FIG. 13 illustrates that the indicated content 1311 is a text. However, an embodiment is not limited thereto. The indicated content 1311 may include an image, a video, or the like.

According to various embodiments, the electronic device 1300 may output a display object 1330 for verifying the determination of creating the widget 1351, before creating the widget 1351. For example, the display object 1330 may include information 1331 of the content, a phone connecting button 1332, a pasting button 1333, a message sending button 1334, a widget creation verifying button 1335, a display object hiding button 1336, or the like. When the phone connecting button 1332 is selected, the electronic device 1300 may execute a phone application; when the message sending button 1334 is selected, the electronic device 500 may execute a message application. When the pasting button 1333 is selected, the electronic device 1300 may paste the indicated content 1311 at a point at which a cursor is placed. When the display object hiding button 1336 is selected, the electronic device 1300 may terminate the output of the display object 1330.

When an input 1340 to select the widget creation verifying button 1335 is received, the electronic device 1300 may create the widget 1351 and may output the created widget 1351 to a specified screen 1350. According to various embodiments, when an input to select the widget 1351 occurs, the electronic device 1300 may execute a clipboard application. Alternatively, when the input to select the widget 1351 occurs, the electronic device 1300 may output the screen 1310 in which the indicated content 1311 is included.

As described above, according to an embodiment, an electronic device may include a display configured to display at least one content, a pressure sensor configured to sense a touch input having a pressure value of a specified value or more, a memory, and a processor operatively connected to the display, the pressure sensor, and the memory. When the touch input occurs in a first screen of the display, the processor may be configured to determine an input location of the touch input, to verify content displayed at a display location of the first screen corresponding to the input location, to create a widget including information associated with the content, and to output the created widget to a second screen of the display.

According to various embodiments, the widget may include at least one of visual information associated with the content and a function button configured to perform a function associated with the content.

According to various embodiments, the second screen may include a home screen or a lock screen.

According to various embodiments, the processor may be configured to provide an interface for receiving verification for creation of the widget from a user, before creating the widget.

According to various embodiments, the interface may include a button object capable of being selected when agreeing to create the widget, and the processor may be configured to create the widget, when the button object is selected.

According to various embodiments, the interface may further include detailed information associated with the content.

According to various embodiments, the interface may further include a controller capable of executing the content, when the content is multimedia content.

Figure 14:
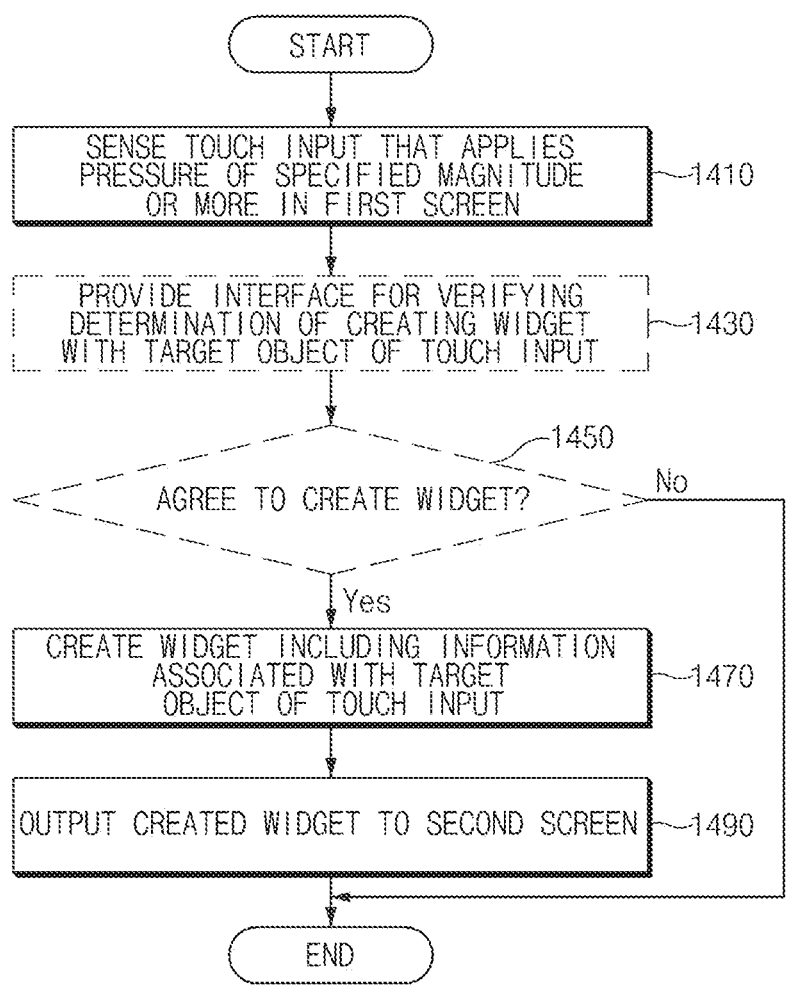
FIG. 14 is a flowchart illustrating an operating method of an electronic device associated with processing a force touch, according to an embodiment.

FIG. 14 is a flowchart illustrating an operating method of an electronic device associated with processing a force touch, according to an embodiment.

Referring to FIG. 14, in operation 1410, an electronic device (e.g., the electronic device 100) may sense a touch input (e.g., a force touch input) having a pressure value of specified value or more in a first screen (e.g., the execution screen of an application). According to an embodiment, the electronic device may sense a force touch input based on a pressure sensor (e.g., the pressure sensing layer 140). When the force touch input is sensed, the electronic device may determine an input location of the force touch input and may verify content displayed in a screen area corresponding to the input location. Furthermore, the electronic device may designate the content as the target object of the force touch input.

In operation 1430, the electronic device may provide an interface for verifying the determination of creating a widget associated with a target object of the force touch input. According to an embodiment, the electronic device may output a display object (e.g., a pop-up, a card view, or the like) including a button object (e.g., a widget creation verifying button) disposed to be selected when a user agrees to create the widget. According to various embodiments, the display object may include not only a button object but also detailed information associated with the target object of the force touch input. The detailed information associated with the target object may be output in various forms depending on the type of the target object. For example, when the target object is associated with multimedia content such as a video or the like, the display object may include a controller capable of executing the multimedia content. According to an embodiment, the electronic device may output the display object to the first screen.

In operation 1450, the electronic device may determine whether the user agrees to create the widget. For example, the electronic device may determine whether the button object is selected. When the button object is selected, the electronic device may determine that the user agrees to create the widget.

When the user agrees to create the widget (e.g., when the button object is selected), in operation 1470, the electronic device may create a widget including information associated with the target object of the force touch input. For example, the widget may include at least one of visual information associated with the target object and a function button configured to perform a function associated with the target object.

In operation 1490, the electronic device may output the created widget to a second screen (e.g., a home screen).

According to various embodiments, the electronic device may omit the execution of operation 1430 and operation 1450. For example, when the force touch input occurs in the first screen, the electronic device may create a widget associated with the target object of the force touch input and may output the created widget to the second screen As described above, according to various embodiments, a method processing a touch of an electronic device may include sensing a touch input having a pressure value of a specified value or more in a first screen of a display, determining an input location of the touch input and verifying content displayed at a display location of the first screen corresponding to the input location, creating a widget including information associated with the content, and outputting the widget to a second screen of the display.

According to various embodiments, the creating of the widget may include including at least one of visual information associated with the content and a function button configured to perform a function associated with the content, in the widget.

According to various embodiments, the outputting of the widget to the second screen may include outputting the widget to a home screen or a lock screen.

According to various embodiments, the method processing the touch may further include providing an interface for receiving verification for creation of the widget from a user, before the execution of the creating of the widget.

According to various embodiments, the providing of the interface may include providing a button object capable of being selected when agreeing to create the widget.

According to various embodiments, the providing of the interface further may include providing detailed information associated with the content.

According to various embodiments, the providing of the interface may further include providing a controller capable of executing the content, when the content is multimedia content.

The term "module" used herein may include a unit, which is implemented with hardware, software, or firmware, and may be interchangeably used with the terms "logic", "logical block", "part", "circuit", or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., a memory) in the form of a program module. The instruction, when executed by a processor (e.g., a processor), may cause the processor to perform a function corresponding to the instruction.

According to various embodiments, a computer-readable storage medium storing instructions that, when executed by at least one processor, cause the processor to at least one operation. The at least one operation may include sensing a touch input having a pressure value of a specified value or more in a first screen of a display, determining an input location of the touch input and verifying content displayed at a display location of the first screen corresponding to the input location, creating a widget including information associated with the content, and outputting the widget to a second screen of the display.

The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

According to various embodiments, a module or a program module may include at least one of the above components, or a part of the above components may be omitted, or other components may be further included. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

The invention claimed is:

1. An electronic device comprising:
a display configured to display at least one content;
a pressure sensor configured to sense a touch input having a pressure value of a specified value or more;
a memory; and
a processor operatively connected to the display, the pressure sensor, and the memory,
wherein the processor is configured to:
when the touch input occurs in a first screen of the display,
determine an input location of the touch input;
verify content displayed at a display location of the first screen corresponding to the input location;
provide an interface for receiving verification for creation of a widget including information associated with the content from a user;
create the widget in response to receiving the verification for creation of the widget; and
output the created widget to a second screen of the display.

2. The electronic device of claim 1, wherein the widget includes at least one of visual information associated with the content and a function button configured to perform a function associated with the content.

3. The electronic device of claim 1, wherein the second screen includes a home screen or a lock screen.

4. The electronic device of claim 1, wherein the processor is configured to:
output the interface to the first screen, before creating the widget.

5. The electronic device of claim 4, wherein the interface includes a button object capable of being selected when agreeing to create the widget, and
wherein the processor is configured to:
create the widget, when the button object is selected.

6. The electronic device of claim 5, wherein the interface further includes detailed information associated with the content.

7. The electronic device of claim 5, wherein the interface further includes a controller capable of executing the content, when the content is multimedia content.

8. A method of processing a touch of an electronic device, the method comprising:
sensing a touch input having a pressure value of a specified value or more in a first screen of a display;
determining an input location of the touch input and verifying content displayed at a display location of the first screen corresponding to the input location;
providing an interface for receiving verification for creation of a widget including information associated with the content from a user;
creating the widget in response to receiving the verification for creation of the widget; and
outputting the widget to a second screen of the display.

9. The method of claim 8, wherein the creating of the widget includes:
including at least one of visual information associated with the content and a function button configured to perform a function associated with the content, in the widget.

10. The method of claim 8, wherein the outputting of the widget to the second screen includes:
outputting the widget to a home screen or a lock screen.

11. The method of claim 8, further comprising:
outputting the interface to the first screen, before the execution of the creating of the widget.

12. The method of claim 11, wherein the providing of the interface includes:
providing a button object capable of being selected when agreeing to create the widget.

13. The method of claim 12, wherein the providing of the interface further includes:
providing detailed information associated with the content.

14. The method of claim 12, wherein the providing of the interface further includes:

providing a controller capable of executing the content, when the content is multimedia content.

15. A computer-readable storage medium storing an instruction that, when executed by at least one processor, causes the processor to:
sense a touch input having a pressure value of a specified value or more in a first screen of a display;
determine an input location of the touch input and verifying content displayed at a display location of the first screen corresponding to the input location;
providing an interface for receiving verification for creation of a widget including information associated with the content from a user;
create the widget in response to receiving the verification for creation of the widget; and
output the widget to a second screen of the display.

\* \* \* \* \*